(12) United States Patent
Durfee

(10) Patent No.: US 8,131,960 B2
(45) Date of Patent: Mar. 6, 2012

(54) AUTOMATED BACKUP AND REVERSION SYSTEM

(76) Inventor: Stephen W. Durfee, Navarre, FL (US)

( * ) Notice: Subject to any disclaimer, the term of this patent is extended or adjusted under 35 U.S.C. 154(b) by 899 days.

(21) Appl. No.: 12/154,205

(22) Filed: May 21, 2008

(65) Prior Publication Data

US 2009/0292889 A1 Nov. 26, 2009

(51) Int. Cl.
*G06F 12/00* (2006.01)
(52) U.S. Cl. ............. 711/162; 711/163; 710/36; 710/38
(58) Field of Classification Search ........................ None
See application file for complete search history.

(56) References Cited

U.S. PATENT DOCUMENTS

| | | | |
|---|---|---|---|
| 5,920,733 A | 7/1999 | Rao | |
| 6,363,462 B1 | 3/2002 | Bergsten | |
| 6,611,850 B1 | 8/2003 | Shen | |
| 6,718,447 B2 | 4/2004 | Cochran | |
| 7,020,756 B2 | 3/2006 | Suzuki et al. | |
| 7,031,986 B2 | 4/2006 | Ito | |
| 2007/0083575 A1 | 4/2007 | Leung et al. | |

*Primary Examiner* — Reginald Bragdon
*Assistant Examiner* — Baboucarr Faal
(74) *Attorney, Agent, or Firm* — Stephen C. Thomas; Robert A. Lynch; Hayworth, Chaney & Thomas P.A.

(57) ABSTRACT

An automated backup and reversion system comprising at least two storage systems with one source storage system being physically connected to at least one host system during normal processing at any given time. During the backup process, involved storage devices are physically disconnected from the host system. The at least one destination storage system receiving the information backup may thereafter be connected to the host system to allow for subsequent host processing. The initial source storage system may then remain disconnected from the host system and assume the role of a destination storage system. Each storage system is located at the same logical location while being processed so that the host system is unaware that any storage system change has occurred. A plurality of storage systems may be configured with only one being processed at any given time, and the remainder may comprise successive backups after any negative event.

18 Claims, 5 Drawing Sheets

AUTOMATED BACKUP AND REVERSION SYSTEM

CROSS REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The present invention pertains to the field of computer systems. More particularly, the present invention relates to storage controllers for controlling data transfers between at least one host processing systems and at least two storage systems.

2. Background Art

Computer systems sometimes handle valuable or irreplaceable data. Data maintained by a computer system may be of vital importance, for example, in business applications such as airline reservations, bank account management, electronic funds transfers, shipping and receiving, and inventory control. Consequently, there is a need to ensure that valuable data is adequately protected against loss or damage.

It is common to store large volumes of data on mass storage devices, such as magnetic or optical disks. Occasionally, however, a mass storage device will fail, resulting in the loss of stored data. Consequently, it is a common practice to store a back-up copy of data that is considered valuable on a separate, backup storage device.

In use, modern host systems using storage including computers, mobile computers, mini PCs, hosts, clients, servers, blade computers, desktop information systems, laptop information systems, Pocket PCs, Personal Digital Assistants (PDA), Personal Information Managers (PIM), mobile phones and smartphones, or any system processing information, are prone to a wide variety of problems associated with the attached storage system that can result in severe problems for the user.

One problem that is often experienced is a storage system failure. Many storage systems, such as the standard hard disk, are mechanical in nature and can fail due to a mechanical malfunction. Even solid-state storage systems are not immune from device failure.

Another problem that has become a substantial issue is a malicious code infection, sometimes known as a virus infection, which can fatally infect the contents of a storage system. Despite using advanced anti-virus software, many users still come under brutal malicious code attacks.

Still another problem faced by a host system occurs during software installation and updating. During such times, a software installation wizard routinely changes existing files and settings on the storage device—oftentimes permanently. If the software installation or update does not leave the host system with the desired results, undoing the installation may prove impossible or time consuming. For example, if a host user is installing a suite of four software applications and the installations are working well up through the third application and then a negative event occurs, the host system may have no automated backup and reversion configuration control to gracefully revert back to a saved state just before the problematic third installation occurred.

A similar problem is frequently encountered by many users during file modification or deletion. By the time a user discovers that a file should not have been modified or deleted, it may be too late to recover back to the original file. Additionally, if the user is configuring the user interface of a host system, and such a configuration is not performed correctly, recovery to a workable host system state may prove difficult if not impossible.

Another problem faced by host systems in some industries involves the unintentional receipt, such as via e-mail, of a classified file on an un-accredited host system. Should this occur, protocol requires that the entire contents of the un-accredited host system be erased regardless of unaffected files. A simple miss-sent e-mail can have profound effects on the unintended recipient.

The common thread to these above-mentioned problems is an unintended or undesired modification to the information stored on a storage device of a host system. One simple solution to the above-mentioned problems is to make regular backups of the information stored on the storage system connected to the host system. If a negative event occurs, such as a virus attack or an unwanted file deletion, then the affected information can be restored from the backup. In this manner, the only information that may be lost is that which was created or modified since the last backup event.

To address these problems, a secondary storage device can be associated with the host system to backup a portion of or the entire contents of the primary storage system. Backup content may include user created information, operating system information, and any software information added in addition to the operating system. Such a backup to the secondary storage system may occur in the same interval in which a user normally makes backups. The problem with this approach is that it is technically difficult for the average host system user to implement such a process. Another problem is that a backup typically requires the host system user to remember to perform the backup, since the process may not normally be automated. Additionally, as the secondary storage system is logically connected to and accessible by the host operating system, the malady that causes the contents of the first storage system to become corrupt can also be immediately spread to any other connected storage systems, thereby possibly corrupting a plurality of storage systems.

Another approach is to use checkpointing software that marks regular intervals of time for a host system and allows the host system to return to the prior state of the host system at the beginning of any such time interval—the checkpoint—at any subsequent time. For example, if the checkpoints are everyday at 12:01 AM, the information system can revert, when necessary, back to the state it occupied at 12:01 AM that day. Once again the problem with this approach is that the checkpointing system is under the control of the host operating system and is contained on the same storage system. A malady that befalls the host system requiring the backup may then continue to negatively impact the host system even after it has been backed up to a previous checkpoint. Additionally, this approach is computationally expensive and may adversely affect system performance.

Accordingly, there exists a need in the art for an automated backup and reversion system that allows a user to recover from an adverse event that befalls a source storage system of a host system while addressing the above-mentioned shortcomings found in the prior art. Such a backup and reversion system must be able to recover a portion of or the entire contents of the source storage system which may include user created information, operating system information and the any software information added in addition to the operating system, without the need to install or update previously installed software. Such a backup system may be prophylactically isolated from the main host system so that any malady that may affect the source storage system does not spread to any of the at least one destination storage systems or to the backup system itself. Such a system must not be unduly complex or computationally expensive so that an average user of a host system may utilize the present inventive system without a significant affect on system performance.

BRIEF SUMMARY OF THE INVENTION

The present invention provides an automated backup and reversion system ("ABR system") for an information system. The present backup and reversion system for an information system may comprise at least one host system for processing information, at least two storage systems, wherein only one of the at least two storage systems at a time may be communicatively connected to the at least one host system for processing information, at least one duplicator, wherein the at least one duplicator reads at least a portion of information from at least a source storage system of the at least two storage systems and writes the at least a portion of information to at least one destination storage system of the at least two storage systems, at least two switching systems, wherein the at least two switching systems function to switch all connections between each of the at least one host system and the at least two storage systems, and at least one controller system, wherein the at least one controller system communicates with and controls the functionality of the at least one duplicator and the at least two switching systems, wherein the at least one duplicator, the at least two switching systems, and the at least one controller system are transparent to the at least one host system and the at least two storage systems, whereby the at least one host system and the at least two storage systems are unaware that the at least one duplicator, the at least two switching systems, and the at least one controller system have been inserted therebetween.

The ABR system of the present invention provides a user with the means to recover from an adverse event that befalls a source storage system of at least one host system by periodically powering off the at least one host system and thereafter backing up a portion of or the entire contents of the source storage system. Alternatively, the host system may remain in a powered-on configuration and be free to connect to, via the at least two switching systems, and perform ancillary processing tasks on an alternate source storage system while disconnected from a first source storage system during its duplication process. During the backup process, information from the source storage system is copied to at least at least one destination storage system. This process provides a user with the ability to rapidly recover from an adverse event by switching the at least one host system to any available backup destination storage system saved prior to the adverse event without the need to install or update software or to await a lengthy restoration process. The at least one host system may be prophylactically isolated from other elements of the ABR system so that any malady that affects the at least one host system and/or the source (e.g. processing) storage system does not spread to any of the at least one destination storage systems, the at least two switching systems, the at least one duplicator, or the at least one controller system. At least one duplicator associated with the at least two switching systems may be utilized during the backup process outside of normal host system processing and operation so that the at least one duplicator has no affect on host system performance.

In use, the ABR system of the present invention may halt processing on at least one host system and physically disconnect the at least one host system from the source storage system. Once disconnected, the source storage system is then engaged to the at least one duplicator to backup a portion of or the entire contents of the source storage system to at least one destination storage system. Such a backup process may be initiated manually by a user, at a user specified regular interval, or automatically by the at least one controller system. Upon completion of the backup process, the at least one controller system may switch the host system to now operate and process from this most recent destination storage system or any other currently available backup storage device. The ABR system independently provides for periodic backup of information from the current host processing source storage system to at least one destination storage system and may also allow for rapid physical connection of the at least one host system to any other single destination storage system at any given time. Such capability provides a host user with rapid access to information configurations at different points in time and rapid recovery from any negative events that may befall information stored on a source storage system of the present invention.

DETAILED DESCRIPTION OF THE INVENTION

The present invention provides an automated backup and reversion system ("ABR system") for an information system. The present invention comprises at least one host system, at least two storage systems, at least two switching systems, at least one duplicator, and at least one controller system. The at least two switching systems, at least one duplicator, and at least one controller system may be transparent to the at least one host system and the at least two storage systems so that both are unaware that the at least two switching systems, at least one duplicator, and at least one controller system have been inserted therebetween. The ABR system, via the at least two switching systems, serves to switch all connections occurring between the at least one host system and all storage systems. The functionality of the ABR system may be implemented on a single unitary device or on separated devices. The majority of embodiments described herein employ the use of separate devices to aid in comprehension.

Referring now generally to FIGS. 1-6, it is shown that the ABR system 10 of the present invention may be used in conjunction with at least one conventional host system 12 such as a computer. Host systems 12 may comprise any system capable of processing information and may include but are not limited to computers, mobile computers, mini PCs, hosts, clients, servers, blade computers, desktop information systems, laptop information systems, Pocket PCs, Personal Digital Assistants (PDA), Personal Information Managers (PIM), mobile phones, smartphones, and any system processing information that has at least one writeable volatile or non-volatile storage system.

Figure 1:
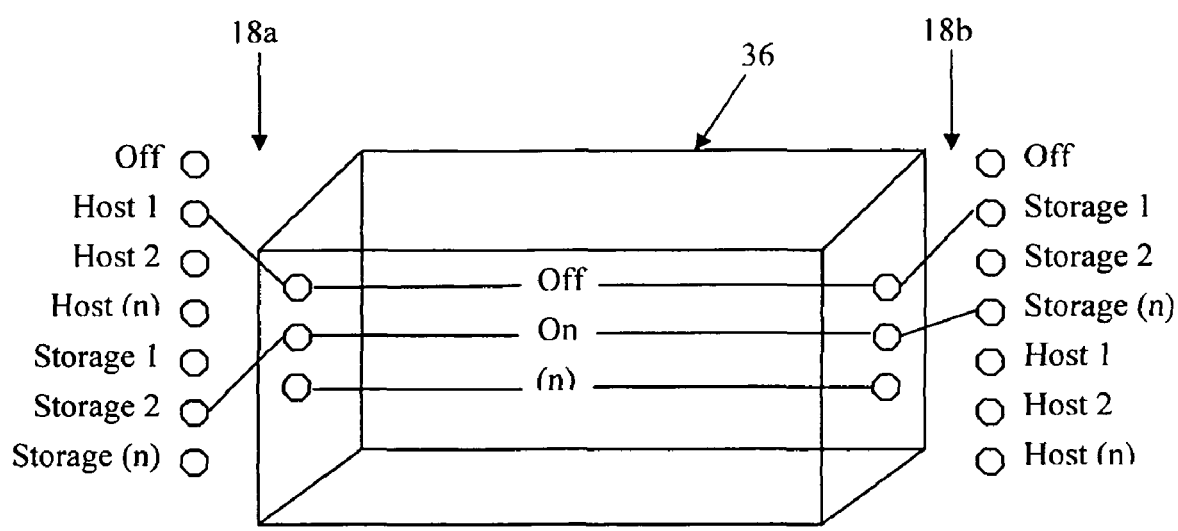
FIG. 1 depicts a schematic diagram of general connections that may be provided for in an embodiment of the system of the present invention.

As depicted in FIG. 1, the ABR system 10 may comprise at least one host system, at least two storage systems, at least two switching systems 18a,18b, at least one duplicator 36, and at least one controller system 14. The total number of each of these respective components may be freely scalable to infinity or (n) number of like components as desired.

Figure 2:
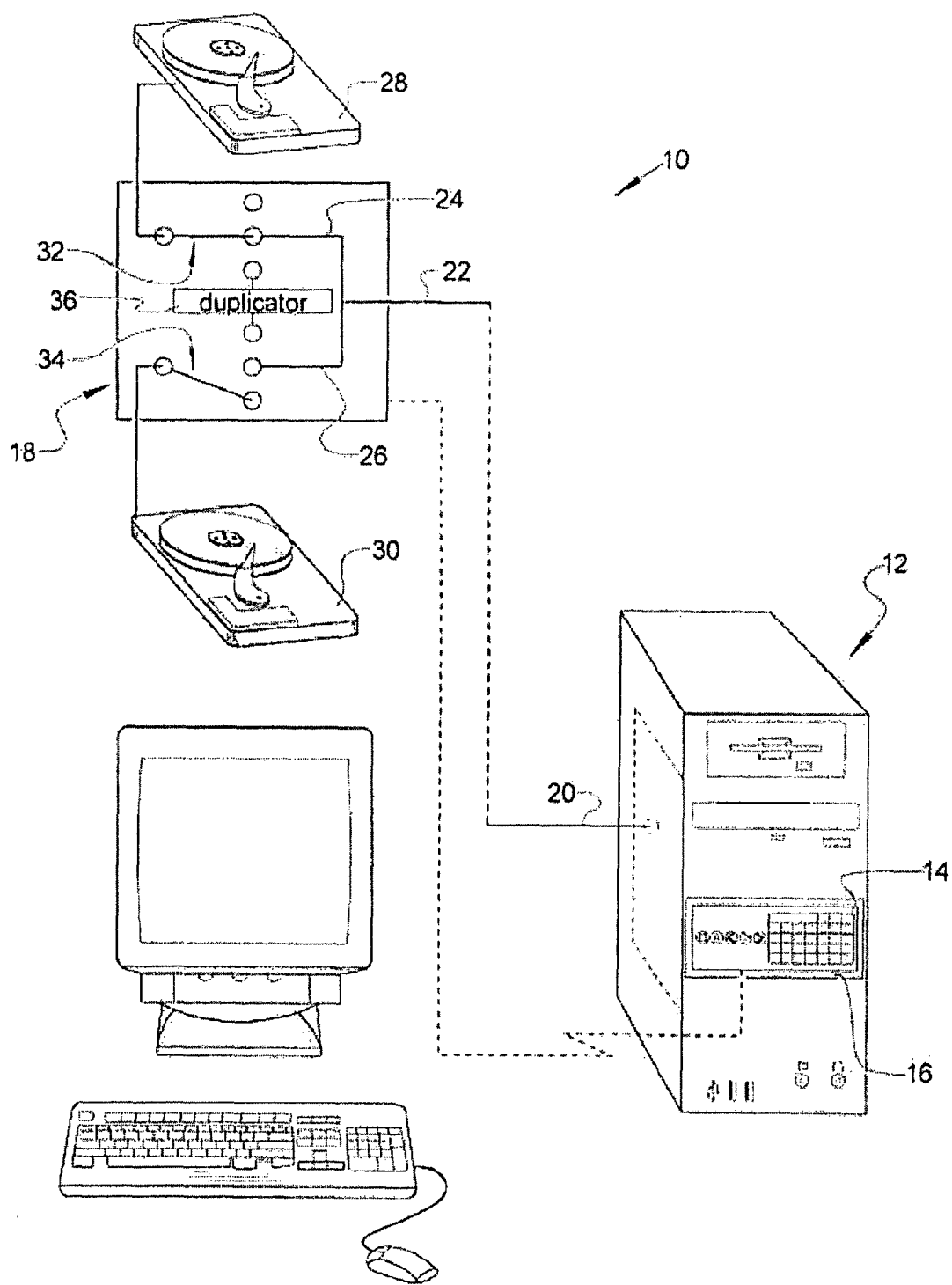
FIG. 2 depicts a schematic diagram of the automated backup and reversion system ("ABR system") of the present invention during normal host system operation wherein at least one host system is processing information with a source storage system.
Figure 3:
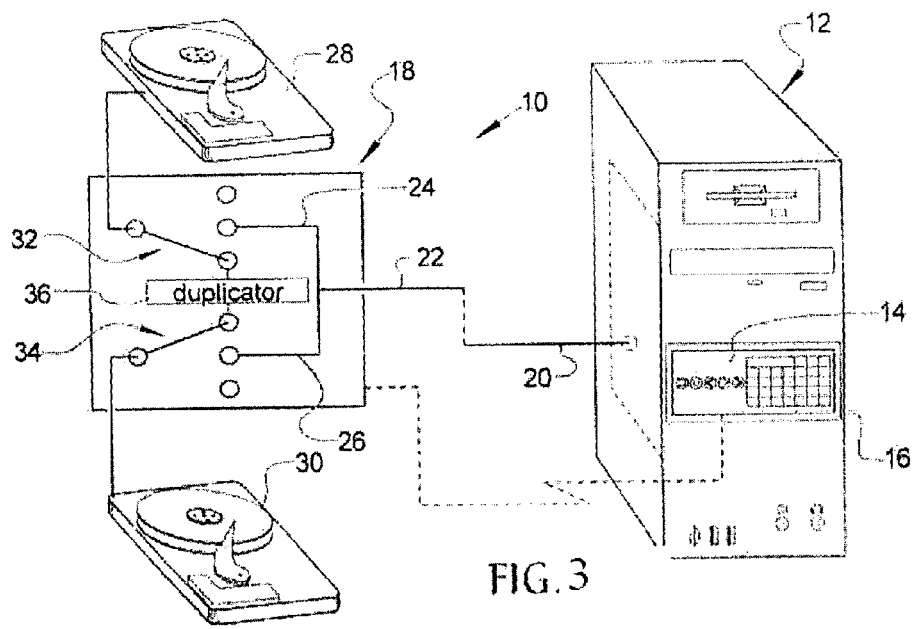
FIG. 3 depicts a schematic diagram of the ABR system during backup of the information of the source storage system to at least one destination storage system.

As depicted in FIG. 2, the ABR system 10 may utilize at least one controller system 14 that is connected to the CPU of at least one host system 12 in any means known within the art. In an embodiment of such a connection, the at least one controller system 14 is installed in an unused bay 16 of the at least one host system 12. The at least one controller system 14 has the functionality to be configured either manually or automatically, and may further be controlled locally or remotely via an information network. Additionally, the at least one controller system 14 may be time based wherein time information may be obtained from internal time calculations which may be initiated from user input or default settings, from an accurate time source external to the ABR system 10 such as via the Global Positioning Satellite ("GPS") information system, from a controller system 14 configured as a master that may communicate time information to at least one slave controller system 14 via an information network, and the like. A user may manually activate the backup process at any given time, the user may configure the ABR system 10 to initiate at specified time intervals, and/or the ABR system 10 may automatically activate the backup process. As a safeguard, the at least one controller system 14 may be operating system independent and not initiate duplication of a specific storage system while the specific storage system is being processed by the at least one host system 12, thereby remaining immune to malicious code that affects the host system 12. The at least one controller system 14 may first instruct the at least one host system 12 to power down or perform ancillary processing on a second storage system before duplication may then begin on a first storage system. The at least one controller system 14 is further configured to be in signal processing communication with at least two switching systems 18.

The at least two switching systems 18 may switch all connections between the at least one host system 12 and the at least two storage systems 28,30. The at least two switching systems 18 may only connect to a component that is not already connected to by any other switching system 18 or to a configuration of disconnect. This functionality includes the ability to connect the at least one host system 12 to only one source storage system during normal host system 12 information processing, and disconnect the at least one host system 12 from all storage systems while independently connecting the source storage system to any number of destination storage systems for backup duplication purposes. The at least one controller system 14 may allow or instruct the at least one host system 12 to maintain a powered on state during host processing and a powered-off state during switching of the source storage system 28. The at least one controller system 14 may thereafter free the at least one host system 12 to perform ancillary processing tasks utilizing another destination storage system not currently engaged in the backup process. A Information System Host Device Power Configuration Connections (ISHDPCC) system may be communicatively connected between the at least one host system 12 and the at least one controller system 14, whereby the at least one controller system 14 may control the functionality of the at least one host system 12 into a powered-on or powered-off state. The at least two switching systems 18 may be connected to an input/output connection 20 of the at least one host system 12 via a channel connection 22 having at least a first leg 24 and a second leg 26.

The at least two switching systems 18 may further be implemented to have the ability to appropriately switch the electrical and mechanical power connections of the respective components within the ABR system 10. Such ability may be provided for by any means of wire technology, software technology (e.g. software-initiated control settings), and/or the like known within the art. As depicted in FIG. 1, the at least one duplicator may provide one or more duplicator channels to allow for ancillary processing of the host system 12 while also allowing for concurrent duplication of at least one storage system 28,30. The one or more duplicator channels may be expanded to include any number (n) of available duplicator channels. The at least one duplicator 36 or the at least two switching systems 18 may communicate to the at least one controller system 14 which of the any number (n) of available duplicator channels are currently in use or are available for use in duplication or host processing.

One configuration where the at least two switching systems 18 switch the power connections of a component, such as a storage system 28,30, may be designated as a professional mode. Another configuration where the at least two switching systems 18 do not switch the power connections of a component, such as a storage system 28,30, may be referred to as a standard mode. If the at least two switching systems 18 have been implemented to switch the power connections, then the at least two switching system 18 may provide any required operational power requirements for any components within the ABR system 10. The electrical, mechanical, and/or power connections implemented by the at least two switching systems 18 may be the same existing standard utilized by the at least one host system 12 and the at least two storage systems 28,30 may comprise a Parallel Advanced Technology Attachment (PATA), Serial Advanced Technology Attachment (SATA), external Serial Advanced Technology Attachment (eSATA), and/or any other storage device known within the art. In this manner the at least two switching systems 18 may be capable of switching data connections, power connections, or any combination thereof to components of the ABR system 10.

The ABR system 10 further comprises at least two storage systems. The at least two storage systems may comprise a source storage system for host processing and at least one destination storage system. In one embodiment, a source storage system 28 of any conventional design known within the art may be connected to a first switching system 18 while at least one destination storage system 30 of any conventional design known in the art may be connected to a second switching system 18. The source storage system 28 may be connected to a first switch 32 while the at least one destination storage system 30 may be connected to a second switch 34. The at least two switching systems 18 may be transparent to both the at least one host system 12 and the at least two storage systems 28,30 of the present invention so that the at least one host system 12 and the at least two storage systems 28,30 are unaware that the at least two switching system 18 has been inserted therebetween.

Additionally, at least one duplicator 36 is associated with the at least two switching systems 18 of the present invention. When the at least two switching systems 18 have made connections to at least two storage systems 28,30, the at least one duplicator 36 is capable of backing up a portion of or the entire information contents of the source storage system to at least one destination storage system. Backed up informational content may include but is not limited to user created information, the operating system information, and any software information added in addition to the operating system. Preferably during such a process, each storage system 28,30 within the ABR system 10 may be of equal storage volume and thus each storage system 28,30 may have sufficient capacity to hold the entire informational content of any other storage system. Alternatively, the at least two storage systems 28,30 may be of a storage capacity at least as large as the at least a portion of information to be duplicated. As a safeguard, the at least one duplicator 36 may be operating system independent and not perform duplication of a source storage system 28 while the at least one host system 12 is processing information on the source storage system 28, thereby remaining immune to malicious code that affects the at least one host system 12. The at least one controller system 14 may instruct the at least one duplicator 36, via a connection therebetween, when to execute duplication of the source storage system 28 and when to remain idle.

In an alternative embodiment as depicted in FIG. 2, the first switch 32 may be disposed in one of three positions: (1) disconnected wherein the initial source storage system 28 is physically disconnected from any other component of the ABR system 10, (2) connected to the first leg 24 of the channel connector 22 wherein the source storage system 28 is physically connected to the at least one host system 12 and thus the at least one host system 12 can read to and write from the source storage system 28 (as illustrated in FIG. 2), or (3) physically connected to the at least one duplicator 36 wherein the initial source storage system 28 is physically connected to the at least one duplicator 36 and physically disconnected from the first leg 24 of the channel connector 22 and thus from the at least one host system 12. Similarly, the second switch 34 may also be disposed in one of three positions: (1) disconnected wherein the destination storage system 30 is physically disconnected from any other component of the ABR system 10 (as illustrated in FIG. 2), (2) connected to the second leg 26 of the channel connector 22 wherein the initial destination storage system 30 is physically connected to the at least one host system 12 and thus the at least one host system 12 can read to and write from the initial destination storage system 30 which now assumes the role as source storage system 30, or (3) physically connected to the at least one duplicator 36 wherein the destination storage system 30 is physically connected to the at least one duplicator 36 and physically disconnected from the second leg 26 of the channel connector 22 and thus from the at least one host system 12.

The at least one controller system 14 may have connections with and thereby control operation of the at least one host system 12, the at least two switching systems 18, and the at least one duplicator 36. The at least one controller system 14 may allow or instruct the at least one host system 12 to maintain either a powered-on state or a powered-off state, instruct the at least two switching systems 18 as to which available systems shall be connected, direct the at least one duplicator 36 into either an active or inactive state, associate a chronological identifier with each of the at least one destination storage systems receiving the at least a portion of information (e.g. date stamps, sequential indicia, and the like), said at least one controller system further identifies which of said at least one destination storage systems are available to be overwritten via said chronological identifiers, and identify via the associated chronological identifiers which destination storage systems are available to be overwritten during the next backup procedure. The at least one controller system 14 may also connect to an accurate external time information source such as via the Global Positioning Satellite (GPS) information system. In multi-ABR system configurations, the at least one controller system 14 may have a connection to an information network for communicating with other controller systems whereby communication of information such as operational instructions and at least one controller system 14 status updates may be relayed.

In operation, the ABR system 10 is constructed such that the at least one controller system 14 is physically connected to the at least one host system 12. Appropriate software may be installed to manage the at least one controller system 14. The at least two switching systems 18 are connected to the input/output connection 20 of at least one host system 12 and are addressable as if the at least two switching systems 18 were any standard source storage system, in other words, the at least one host system 12 believes the at least two switching systems 18 to be a single source storage system and reads to and writes from the at least two switching systems 18 in a normal fashion. The at least two switching systems 18, as well at other components of the ABR system 10, may also be hardened and isolated from at least one host system 12 information so that it only has enough functionality to perform its required functions and thus is immune to the same malicious code that may negatively impact the at least one host system 12. Hardening may include but is not limited to using antivirus and antispyware protection, regularly downloading the latest manufacturers' patches, disabling unneeded software and applications, closing server ports, and disabling Windows and other programs file-sharing. As a further safeguard, the at least two switching systems 18 may be operating system independent.

The software of the at least one controller system 14 may set a regular time based interval for performing source storage system backups, for example, the controller system software may set source storage system backups to be performed every day at 2:00 AM. During normal host system 12 operations as depicted in FIG. 2, when the ABR system 10 is not performing a backup operation, the at least one host system 12 may be processing from the initial source storage system 28. In such a configuration, the first switch 32 is set to its second position wherein the initial source storage system 28 is physically connected to the first leg 24 of the channel connector 22. The second switch 34 is set to its respective first position wherein the destination storage system 30 is physically disconnected from the second leg 26 of the channel connector 22 and thus from the host system 12. In such a configuration, both the source storage system 28 and destination storage system 30 are physically disconnected from the at least one duplicator 36.

In the configuration depicted in FIG. 2, the at least one host system 12 processes information normally from the source storage system 28. Any read or write operations are addressed to the at least two switching systems 18, which simply physically pass the operation to the source storage system 28 which then performs the desired operation. The entire switching system 18 pass-through may be completely transparent to the at least one host system 12. During the backup process, the at least one host system 12 may obtain its instructions from the at least one controller system 14 and cease normal processing and become idle. As illustrated inn FIG. 3, the at least one controller system 14 may instruct the first switch 32 to move from a connection with the first leg 24 of the channel connector 22 to a connection with the at least one duplicator 36. Similarly, the at least one controller system 14 may instruct the second switch 34 to move from a disconnected position to a connection with the at least one duplicator 36. Once the switching is complete, the at least one controller system 14 may instruct the at least one duplicator 36 to activate, at which time the at least one duplicator 36 backs up a portion of or the entire information contents of the source storage system 28 to the at least one destination storage system 30. During this process the communication path is one way, wherein the at least one duplicator 36 reads from the source storage system 28 and writes to the at least one destination storage system 30.

Figure 4:
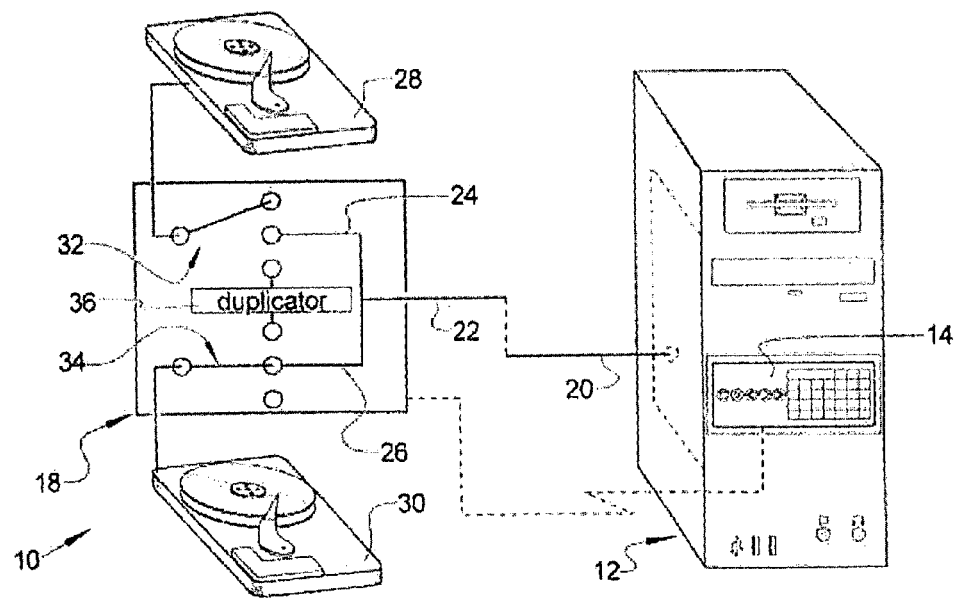
FIG. 4 depicts a schematic diagram of the ABR system during normal host system operation after the backup process has completed wherein the at least one host system now processes information with the initial destination storage system which now assumes the role as the host processing source storage system.

Once the backup process from the source storage system 28 to the at least one destination storage system 30 is complete, the at least one duplicator 36 may update and advise the at least one controller system 14. As depicted in FIG. 4, the at least one controller system 14 may then move the first switch 32 to its first position wherein the initial source storage system 28 is physically disconnected from the at least one duplicator 36 and is also physically disconnected from the first leg 24 of the channel connector 22 and thus the at least one host system 12. The initial source storage system 28 may then assume the role of a destination storage system. The at least one controller system 14 may also move the second switch 34 to its second position wherein the initial destination storage system 30 is physically connected to the second leg 26 of the channel connector 22 and thus to the at least one host system 12. The destination storage system 30 may then assume the role of a host processing source storage system.

Thereafter, the at least one controller system 14 may return the at least one host system 12 to its normal processing mode and relinquish control of the ABR system 10. The at least one host system 12 is now operating in normal fashion and may now be processing from the initial destination storage system 30, which has now become the host processing source storage system. The purpose for now running the at least one host system 12 from the initial destination storage system 30 is to assure that a proper backup process occurred from the initial source storage system 28 to the initial destination storage system 30. The initial source storage system 28 is now available as a destination storage system should a negative event befall the initial destination storage system 30 (now acting as the source storage system) prior to the next backup process, at which point the at least one host system 12 may rapidly switch back to processing from initial source storage system 28.

During the next backup period, the backup process may be reversed with the information contents of the initial destination storage system 30, now communicating with the at least one host system 12, being backed up onto the initial source storage system 28. Once this backup process has completed, the initial source storage system 28 may once again be used as the host processing source storage system with the initial destination storage system 30 again assuming the role of a backup destination storage system.

The at least one controller system 14 may manage time, manage backup time intervals (e.g. automatically by the system 10, at regularly scheduled intervals, or upon user manual activation), configure the at least one host system 12 between a power-on state and a power-off state according to the backup schedule, control and instruct the switching system 18 as to which connections to make, identify which of the at least one destination storage systems are available to be overwritten via the associated chronological identifiers, control activation/deactivation of the at least one duplicator 36, and allow the at least one host system 12 to freeze a desired configuration until instructed not to do so. The freezing of a desired configuration allows a user to copy the desired configuration from the host processing source storage system to any number of available destination storage systems, thereafter allowing for duplication of the desired configuration onto at least one of the at least two storage systems. Such a process effectively forces the at least one host system 12 to utilize an authorized desired configuration located on a frozen backup destination storage system regardless of any changes that take place during the time it is being processed by the at least one host system 12.

As such, the at least two switching systems 18 are limited function switching systems and the at least one duplicator 36 is a limited function read and write device. Accordingly, as these systems are limited in function, their programming and control is also limited and can be isolated so that any malady that affects the at least one host system 12 is not imparted onto any of these systems. Additionally, when a destination storage system is physically disconnected from the at least one host system 12, any corruption that is occasioned on the at least one host system 12 and/or the host processing source storage system is not thereby passed onto any of the at least one disconnected destination storage systems. In such a manner, either the at least one host system 12 is connected to and may be processing from a source storage system or the ABR system 10 is connected to and may be duplicating the source storage system, but both the at least one host system 12 and the ABR system 10 may not be simultaneously connected to the same source storage system. The storage system may also be configured in a state of disconnect from both the at least one host system 12 and the ABR system 10.

Figure 5:
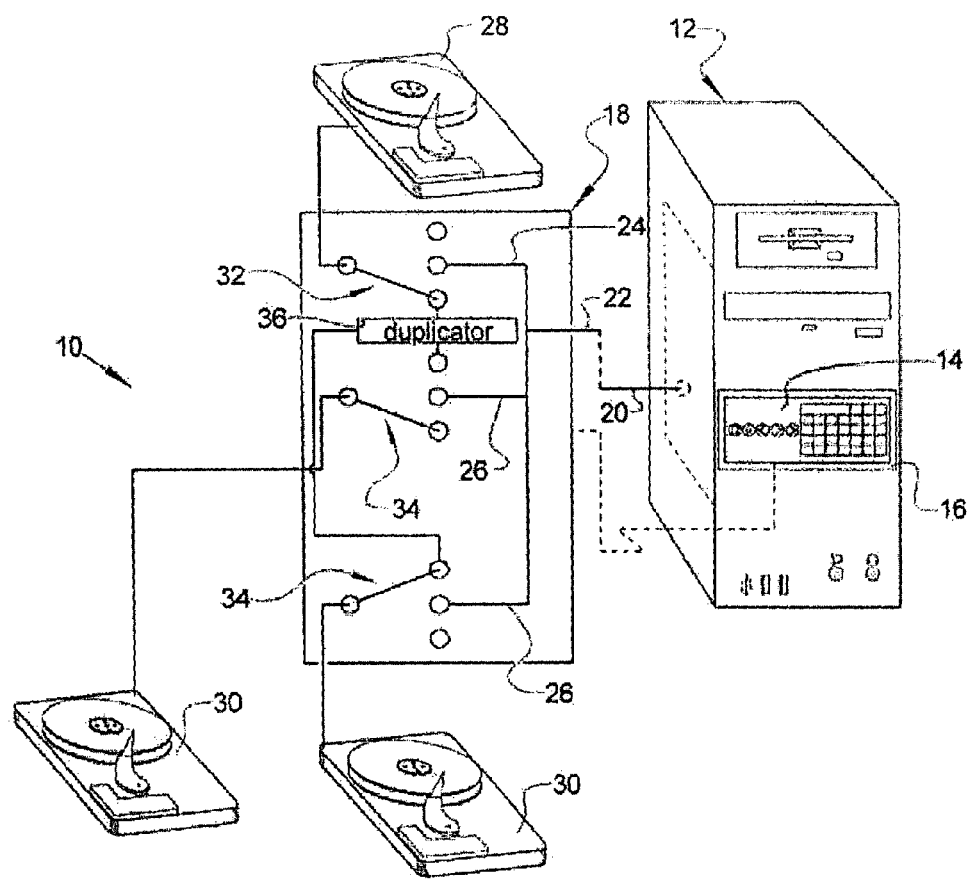
FIG. 5 depicts a schematic diagram of the ABR configuration utilizing at least two destination storage systems.

As depicted in another embodiment in FIG. 5, at least two destination storage systems may be used within the ABR system 10 of the present invention. In such configurations, each additional destination storage system may have its own switch which is capable of switching its respective storage system to one of three positions: (1) a position of disconnect, (2) a connection with an additional leg of the channel connector 22, or (3) a connection with the at least one duplicator 36. The at least one host system 12 may initially process from the initial source storage system 28 (or any available storage means) in the usual fashion, and as discussed above.

As further depicted in FIG. 5, the second switch 34 for the first of at least two destination storage systems 30 may be in a position of disconnect from both the second leg 26 of the channel connector 22 and the at least one duplicator 36. During a backup process, the at least one controller system 14 may instruct the at least two switching systems 18 to move a third switch 35 to create a connection between the second of at least two destination storage systems 31 and the at least one duplicator 36. The at least one controller system 14 may additionally instruct the at least two switching systems 18 to move the first switch 32 to create a connection between the initial source storage system 28 and the at least one duplicator 36 (and thus inherently disconnecting the initial source storage system 28 from the at least one host system 12). The first of at least two destination storage systems 30 may remain in a position of disconnect. In this manner, both the initial source storage system 28 and the second of at least two destination storage systems 31 may be physically connected to the at least one duplicator 36. Responding to instructions from the at least one controller system 14, the at least one duplicator 36 backs up a portion of or the entire information contents of the initial source storage system 28 to the second of at least two destination storage systems 31.

Once the backup process is complete, at least two switching systems 18 may move the first switch 32 to a position of disconnect wherein the initial source storage system 28 is physically disconnected from both the at least one duplicator 36 and the at least one host system 12. The at least two switching systems 18 may also move the third switch 35 of the second of at least two destination storage systems 31 that just received a backup of information content from the initial source storage system 28 to its second position wherein the second of at least two storage systems 31 is physically connected to the third leg 27 of the channel connector 22 and thus to the at least one host system 12. The remainder of switches 32,34 for all other destination storage systems (such as the first of at least two destination storage systems 30) may remain unchanged and disconnected. The initial source storage system 28 and the first of at least two destination storage systems 30 are now both physically disconnected from the at least one host system 12, with both of these storage system 28,30 now assuming the role of destination storage systems while the second of at least two destination storage systems 31 now assumes the role as the source storage system.

During the next backup process, first of at least two destination storage systems 30 may receive a backup of the information contents from the now acting source storage system 31 and the now acting source storage system 31 may once again thereafter become a destination storage system that contains more recent information than that contained on the initial source storage system 28. The first of at least two destination storage systems 30 now becomes the acting source storage system on which the at least one host system 12 processes information. This backup process may continuously repeat, stopping the host from processing on an acting source storage system, backing up a portion of or the entire information contents of the acting source storage system to one or more destination storage systems and then switching the host to process from one of the one or more destination storage systems. Such a system allows for one or more destination storage systems with each destination storage system containing more recent information content than the previously backed up iteration.

A typical three storage system configuration (as shown in FIG. 5) may comprise a host processing initial source storage drive 28 and at least two destination storage systems 30,31. The host processing initial source storage system 28 may run all day Wednesday with the at least one host system 12 and may thereafter be backed up on Thursday at 2:00 AM. The first of at least two destination storage systems 30 may then receive a portion of or the entire information contents of the initial source storage system 28 and thereafter assume the role as acting source storage system on which the at least one host system 12 processes from all day on Thursday. On Friday at 2:00 AM, the second of at least two destination storage systems 31 may then receive a portion of or the entire information contents from the acting source storage system 30 and thereafter become the new acting source storage system on which the at least one host system 12 processes from all day on Friday. If on Friday afternoon malicious code is detected on the acting source storage system 31 that is being processed from by the at least one host system 12, the at least one host system 12 may switch away from the infected acting source storage system 31 and begin processing from the most recently backed up first of at least two destination storage systems 30. If after testing it is discovered that the malicious code is still resident on the at least one host system 12 and had arrived onto the at least one host system 12 on Thursday afternoon, the first of at least two destination storage systems 30 may also be switched away from and replaced with the initial source storage system 28. The two storage systems (30,31) having malicious code may now be identified as destination storage systems ready to be overwritten as needed by future backup processes of the ABR system 10. The number of destination storage systems to be employed is only limited by the budget of the user of the present inventive ABR system 10.

Preferably, although not required within the scope of the invention, all storage systems 28, 30, and 31 may be of the same size so that the entire contents from any one storage system can be backed up to any other storage system without running out of storage space. Alternatively, all storage systems are of a storage capacity at least as the portion of information to be duplicated. Additionally, in a system having multiple destination storage systems, as illustrated in FIG. 5, two or more destination storage systems may simultaneously backup identical copies of the host processing storage system if multiple identical copies of a backup iteration are desired.

Figure 6:
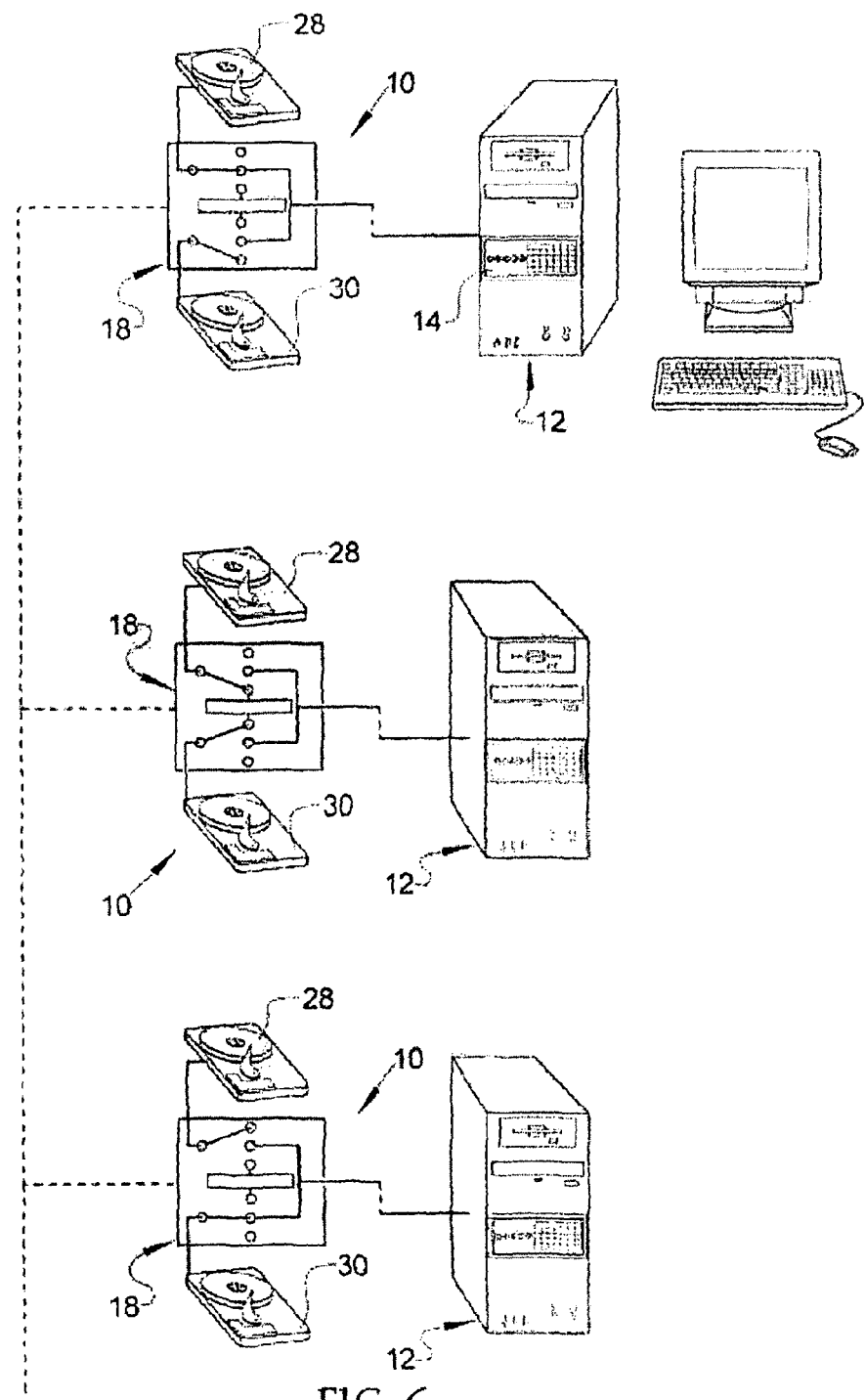
FIG. 6 depicts a schematic diagram of the ABR system in a multi-ABR system configuration where a controller system may assume a master role and transmit instructions and time information to at least one slave controller system.

As depicted in FIG. 6, the ABR system 10 is scalable and may include a multi-system ABR system comprising at least two ABR systems 10 further comprising a plurality of host systems 12 having network connectivity which can be interconnected via an Ethernet connection or any other conventional means known within the art. Each individual host system 12 may have its own ABR system 10 associated therewith and one master controller system of the multi-system ABR system may assume control and transmit instructions and time information to at least one slave controller system thereby allowing all ABR systems 10 to be controlled from a single point and further save administrative costs. In such a configuration, the master controller system is designated and transmits instructions to at least one slave controller systems. Likewise, slave controller systems receive and follow instructions sent from the master controller system. Additionally, in a multiple destination storage system configuration as exemplified in FIG. 5, a master controller system may direct which destination storage systems to recover from in the case of an adverse event.

While the above description contains much specificity, these should not be construed as limitations on the scope of any embodiment, but as exemplifications of the presently preferred embodiments thereof. Many other ramifications and variations of the present invention are possible and will be appreciated by those skilled in the art, and such various changes as to form and detail may be made without departing from the spirit and scope of the invention.

Thus the scope of the invention should be determined by the appended claims and their legal equivalents, and not by the specific examples given.

What is claimed is:

1. A backup and reversion system for an information system, comprising:
   at least one host system for processing information;
   at least two storage systems, wherein only one of said at least two storage systems at a time may be communicatively connected to said at least one host system for processing information;
   at least one duplicator, wherein said at least one duplicator reads at least a portion of information from a source storage system of said at least two storage systems and writes said at least a portion of information to at least one destination storage system of said at least two storage systems;

at least two switching systems, wherein said at least two switching systems function to switch all connections between each of said at least one host system and said at least two storage systems; and at least one controller system, wherein said at least one controller system communicates with and controls the functionality of said at least one duplicator and said at least two switching systems;

wherein during duplication of said at least a portion of information from said source storage system to said at least one destination storage system, said at least two switching systems disconnect said at least one host system from both said source storage system and said at least one destination storage system wherein said at least one duplicator, said at least two switching systems, and said at least one controller system are transparent to said at least one host system and said at least two storage systems, whereby said at least one host system and said at least two storage systems are unaware that said at least one duplicator, said at least two switching systems, and said at least one controller system have been inserted therebetween, wherein said at least one duplicator, said at least two switching systems, and said at least one controller system are operating system independent from said at least one host system, wherein said at least one duplicator, said at least two switching systems, and said at least one controller system are immune to malicious code affecting said at least one host system.

2. The backup and reversion system of claim 1, wherein said at least two switching systems function to connect said at least one host system to any one of said at least two storage systems at a time, to connect said source storage system to said at least one destination storage system with said at least one duplicator connected therebetween, and to put any of said at least one host system and said at least two storage systems into a state of disconnect from one another.

3. The backup and reversion system of claim 1, wherein said at least one duplicator copies the entire information content of said source storage system to said at least one destination storage system.

4. The backup and reversion system of claim 1, wherein said at least one controller system allows or instructs said at least one host system to maintain a powered-on state during host processing and a powered-off state during switching of said source storage system.

5. The backup and reversion system of claim 4, wherein said at least one controller system allows or instructs said at least one host system via either software-initiated control settings or an information network host device power configuration connection system communicatively connected between said at least one controller system and said at least one host system.

6. The backup and reversion system of claim 1, wherein said at least one controller system frees said at least one host system to perform ancillary processing during duplication of said source storage system.

7. The backup and reversion system of claim 1, wherein said at least one controller system associates a chronological identifier with each of said at least one destination storage systems receiving said at least a portion of information, said at least one controller system further identifies which of said at least one destination storage systems are available to be overwritten via said chronological identifiers.

8. The backup and reversion system of claim 1, wherein said at least one controller system freezes a desired configuration by copying said desired configuration from said source storage system to said at least one destination storage system, thereafter allowing for duplication of said desired configuration onto said at least one destination storage system.

9. The backup and reversion system of claim 1, wherein said at least one controller system is activated either manually by a user or automatically via time based settings of said at least one controller system, wherein said time based settings of said at least one controller system are provided for by a means selected from the group consisting of internal time calculations, communication from an accurate time source external to said system, and a master controller system communicating said time based settings to said at least one controller system.

10. The backup and reversion system of claim 1, wherein said at least two storage systems are of a storage capacity at least as large as said at least a portion of information to be duplicated.

11. The backup and reversion system of claim 1, wherein within a multi-system backup and reversion system comprising a plurality of said backup and reversion systems, one of said at least one controller systems assumes a master role and transmits instructions and time information to at least one slave controller system.

12. The backup and reversion system of claim 1, wherein said at least one controller system is controllable either locally or remotely via an information network.

13. The backup and reversion system of claim 1, wherein said at least two switching systems or said at least one duplicator communicate to said at least one controller system which of one or more duplicator channels are currently in use or are available for duplication or host processing.

14. The backup and reversion system of claim 1, wherein said at least two switching systems are capable of switching power connections between any of said at least one host system and said at least two storage systems via one or more duplicator channels within said at least one duplicator.

15. A backup and reversion system for an information system, comprising:

at least one host system for processing information;

at least two storage systems, wherein only one of said at least two storage systems at a time may be communicatively connected to said at least one host system for processing information;

at least one duplicator, wherein said at least one duplicator reads at least a portion of information from a source storage system of said at least two storage systems and writes said at least a portion of information to at least one destination storage system of said at least two storage systems, wherein said at least two storage systems are of a storage capacity at least as large as said at least a portion of information to be duplicated;

at least two switching systems, wherein said at least two switching systems function to switch all connections between each of said at least one host system and said at least two storage systems, said at least two switching systems serving to connect said at least one host system to any one of said at least two storage systems at a time, to connect said source storage system to said at least one destination storage system with said at least one duplicator connected therebetween, and to put any of said at least one host system and said at least two storage systems into a state of disconnect from one another, wherein during duplication of said at least a portion of information from said source storage system to said at least one destination storage system said at least two switching systems disconnect said at least one host system from both said source storage system and said at least one destination storage system; and at least one controller system, wherein said at least one controller system communicates with and controls the functionality of said at least one duplicator and said at least two switching systems, said at least one controller system being controllable either locally or remotely via an information network, said at least one controller system being activated either manually by a user or automatically via time based settings of said at least one controller system;

wherein said at least one duplicator, said at least two switching systems, and said at least one controller system are operating system independent from said at least one host system, wherein said at least one duplicator, said at least two switching systems, and said at least one controller system are immune to malicious code affecting said at least one host system;

wherein said at least two switching systems or said at least one duplicator communicate to said at least one controller system which of one or more duplicator channels are currently in use or are available for duplication or host processing;

wherein said time based settings of said at least one controller system are provided for by a means selected from the group consisting of internal time calculations, communication from an accurate time source external to said system, and a master controller system communicating said time based settings to said at least one controller system; and wherein said at least one duplicator, said at least two switching systems, and said at least one controller system are transparent to said at least one host system and said at least two storage systems, whereby said at least one host system and said at least two storage systems are unaware that said at least one duplicator, said at least two switching systems, and said at least one controller system have been inserted therebetween.

16. The backup and reversion system of claim 15, wherein said at least one controller system allows or instructs said at least one host system to maintain a powered-on state during host processing and a powered-off state during switching of said source storage system or said at least one controller system frees said at least one host system to perform ancillary processing during duplication of said source storage system.

17. The backup and reversion system of claim 15, wherein within a multi-system backup and reversion system comprising a plurality of said backup and reversion systems, one of said at least one controller systems assumes a master role and transmits instructions and time information to at least one slave controller system.

18. A backup and reversion system for an information system, comprising:
at least one host system for processing information;
at least two storage systems, wherein only one of said at least two storage systems at a time may be communicatively connected to said at least one host system for processing information;
at least one duplicator, wherein said at least one duplicator reads at least a portion of information from a source storage system of said at least two storage systems and writes said at least a portion of information to at least one destination storage system of said at least two storage systems;

at least two switching systems, wherein said at least two switching systems function to switch all connections between each of said at least one host system and said at least two storage systems, said at least two switching systems serving to connect said at least one host system to any one of said at least two storage systems at a time, to connect said source storage system to said at least one destination storage system with said at least one duplicator connected therebetween, and to put any of said at least one host system and said at least two storage systems into a state of disconnect from one another, wherein during duplication of said at least a portion of information from said source storage system to said at least one destination storage system said at least two switching systems disconnect said at least one host system from both said source storage system and said at least one destination storage system; and at least one controller system, wherein said at least one controller system communicates with and controls the functionality of said at least one duplicator and said at least two switching systems, said at least one controller system being controllable either locally or remotely via an information network, said at least one controller system being activated either manually by a user or automatically via time based settings of said at least one controller system;

wherein said at least one duplicator, said at least two switching systems, and said at least one controller system are operating system independent from said at least one host system, wherein said at least one duplicator, said at least two switching systems, and said at least one controller system are immune to malicious code affecting said at least one host system;

wherein said at least two switching systems or said at least one duplicator communicate to said at least one controller system which of one or more duplicator channels are currently in use or are available for duplication or host processing;

wherein said at least two storage systems are of a storage capacity at least as large as said at least a portion of information to be duplicated;

wherein said at least one controller system either allows or instructs said at least one host system to maintain a powered-on state during host processing and a powered-off state during switching of said source storage system or frees said at least one host system to perform ancillary processing during said duplication of said source storage system;

wherein said time based settings of said at least one controller system are provided for by a means selected from the group consisting of internal time calculations, a communication from an accurate time source external to said system, and a master controller system communicating said time based settings to said at least one controller system; and wherein said at least one duplicator, said at least two switching systems, and said at least one controller system are transparent to said at least one host system and said at least two storage systems, whereby said at least one host system and said at least two storage systems are unaware that said at least one duplicator, said at least two switching systems, and said at least one controller system have been inserted therebetween.

* * * * *